(12) United States Patent
Mengle et al.

(10) Patent No.: US 9,418,114 B1
(45) Date of Patent: Aug. 16, 2016

(54) AUGMENTING A CONTENT ITEM USING SEARCH RESULTS CONTENT

(71) Applicant: Google Inc., Mountain View, CA (US)

(72) Inventors: Advay Mengle, Sunnyvale, CA (US); Srdjan Petrovic, Palo Alto, CA (US); Shreyas Doshi, Mountain View, CA (US); Gautham Thambidorai, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 562 days.

(21) Appl. No.: 13/921,698

(22) Filed: Jun. 19, 2013

(51) Int. Cl.
*G06F 17/30* (2006.01)

(52) U.S. Cl.
CPC ............................ *G06F 17/30522* (2013.01)

(58) Field of Classification Search
CPC .................. G06F 17/30864; G06F 17/30241; G06F 17/2735; G06F 17/30876; G06F 17/30554; G06F 17/30696; G06F 17/30882; G06F 17/3089
USPC ............................. 705/14.49; 707/722, 755
See application file for complete search history.

(56) References Cited

U.S. PATENT DOCUMENTS

| 7,831,685 | B2 | 11/2010 | Dai et al. |
| 7,849,104 | B2 | 12/2010 | Sun et al. |
| 7,987,194 | B1 | 7/2011 | Walker et al. |
| 8,122,016 | B1 | 2/2012 | Lamba et al. |
| 8,171,021 | B2 | 5/2012 | Guha et al. |
| 8,364,525 | B2 | 1/2013 | Kothiwal et al. |
| 2006/0206479 | A1 | 9/2006 | Mason |
| 2012/0030015 | A1* | 2/2012 | Brunsman .......... G06Q 30/0251 705/14.49 |
| 2012/0265611 | A1* | 10/2012 | Bookman ........... G06F 17/3061 705/14.49 |
| 2013/0091013 | A1 | 4/2013 | Wang et al. |

FOREIGN PATENT DOCUMENTS

EP 1589443 10/2005

OTHER PUBLICATIONS

Joshi et al., "Contextual Advertising through Entity Extraction," *Int'l J Engineering Adv Technol.*, 2013, 2(3):579-582.

* cited by examiner

*Primary Examiner* — Monica Pyo
(74) *Attorney, Agent, or Firm* — Fish & Richardson P.C.

(57) ABSTRACT

Methods, systems, and apparatus include computer programs encoded on a computer-readable storage medium, including a method for providing content. A query is received. Search results are identified that are responsive to the query. A content item is identified for presentation along with the search results. It is determined, based on one or more criteria, when the content item is to be augmented. When it is determined that the content item is to be augmented and after identifying the search results, the content item is augmented based at least in part on an entry in the search result. An augmented content item is created. The augmented content item is provided.

24 Claims, 7 Drawing Sheets

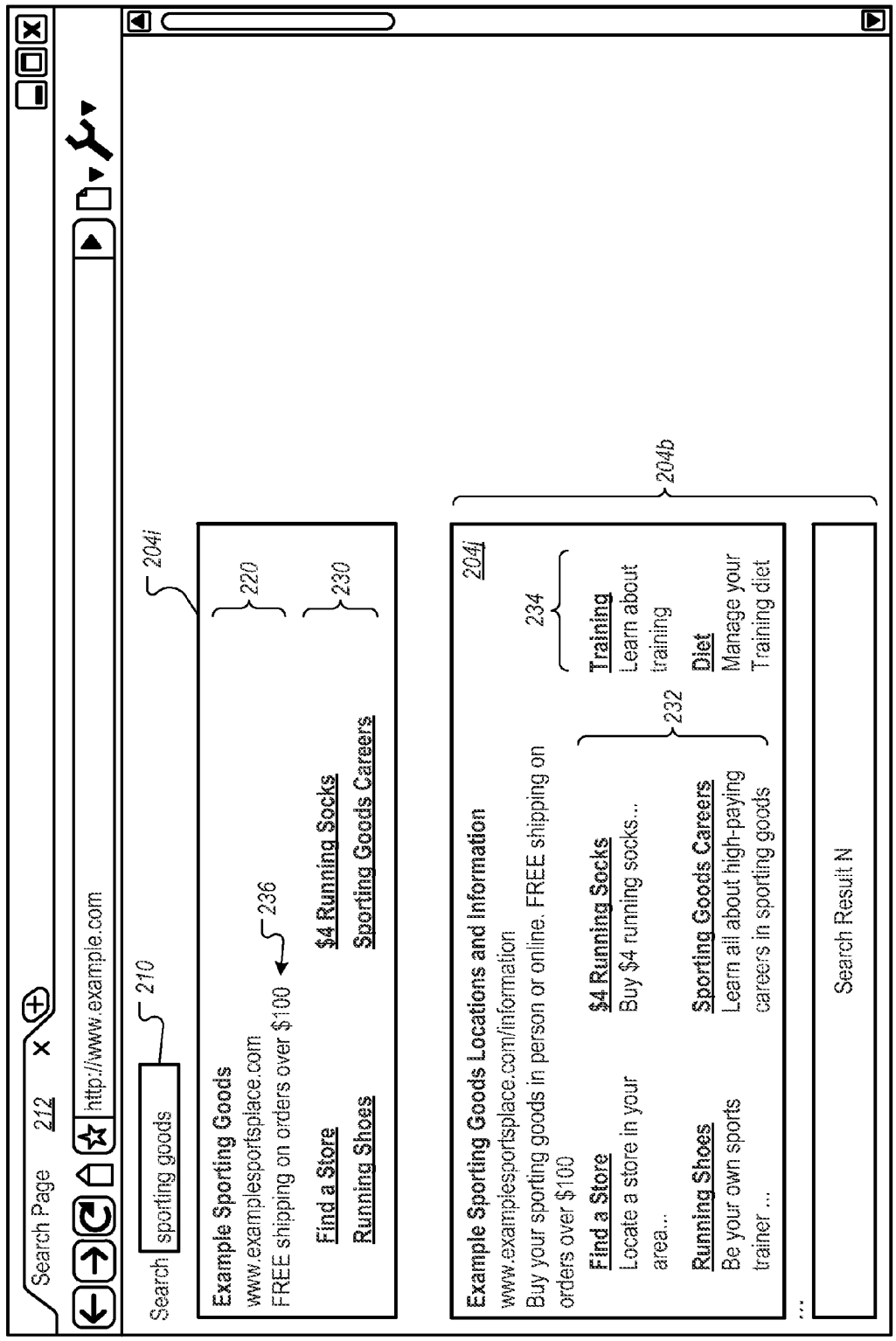

AUGMENTING A CONTENT ITEM USING SEARCH RESULTS CONTENT

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or the relevance of the sponsored content to content presented on a page hosting the slot or a request that is received for the sponsored content. The content can be provided to a user device such as a personal computer (PC), a smartphone, a laptop computer, a tablet computer, or some other user device. Different types of content, such as advertisements and search results, can be related and can be presented to a user at a same time.

SUMMARY

In general, one innovative aspect of the subject matter described in this specification can be implemented in methods that include a computer-implemented method for providing content. The method includes receiving a query. The method further includes identifying search results that are responsive to the query. The method further includes identifying a content item for presentation along with the search results. The method further includes determining, based on one or more criteria, when the content item is to be augmented. The method further includes, when it is determined that the content item is to be augmented and after identifying the search results, augmenting the content item based at least in part on an entry in the search result creating an augmented content item; and providing the augmented content item.

These and other implementations can each optionally include one or more of the following features. Augmenting the content item can include adding copy from a search result entry into the content item to create the augmented content item. Augmenting the content item can further include adding components to the content item from the search result entry. The components can be selected from the group comprising creative text, extension or content item format components. The extensions can be location extensions. Augmenting can include synthesizing site links for the content item including determining that a search result entry, and the content item can be associated based at least in part on uniform resource locators (URLs) for the two and creating site links with one or more of the URLs and titles inferred from the search result entry. Augmenting the content item can include substituting copy from a search result entry for content included in a creative associated with the content item. The copy can be selected by a search system as part of the identification of the search results, and substituting can include substituting the copy for one or more of the headline, text, destination link, or other portion of the content item. Augmenting can include synthesizing one or more location extensions to be included with the content item including matching same domain or same entity organic search result entries associated with an entity with the content item and copying location information for an entity and including the location information in the augmented content item. Determining, based on one or more criteria, when the content item is to be augmented can include determining when the content item and the search result entry are concurrently visible on a same user interface and not augmenting the content item based on the concurrent visibility. Determining concurrent visibility can be based on a fold line associated with a user interface used to present the search results and the content item. Determining concurrent visibility can be based on a location of the search result entry, and augmenting can occur only when the search result entry is not on a first page of the search results. Determining concurrent visibility can be based on a user scroll activity. Augmenting can include replacing one or more content item components with similar components from the search result entry only when first criteria are satisfied. The first criteria can be quality or performance criteria based on a proposed augmentation. Augmenting can include altering the content item to be consistent with other content displayed as part of the search results. Augmenting can include altering the content item so as to vary the content item relative to other content displayed as part of the search results. Altering can include altering a content item format. Varying can include varying a content item format. Providing can include providing the augmented content item along with search results. Providing can include logging the augmented content item. The method can further include providing suggestions to content sponsors based on logged augmented content items.

In general, another innovative aspect of the subject matter described in this specification can be implemented in computer program products that include a computer program product tangibly embodied in a computer-readable storage device and comprising instructions. The instructions, when executed by one or more processors, cause the processor to: receive a query; identify search results that are responsive to the query; identify a content item for presentation along with the search results; determine, based on one or more criteria, when the content item is to be augmented; and, when it is determined that the content item is to be augmented and after identifying the search results: augment the content item based at least in part on an entry in the search result creating an augmented content item, and provide the augmented content item.

In general, another innovative aspect of the subject matter described in this specification can be implemented in systems, including a content management system comprising a content identification engine that evaluates terms and phrases in a query received by the content management system to identify content responsive to the request, an augmentation decision engine that determines, based on one or more criteria, when the content item is to be augmented, a content item augmentation engine that augments the content item based at least in part on an entry in the search results, a request handler that handles requests for content received by the content management system, including selecting and providing content in response to requests for content: one or more processors and one or more memory elements including instructions. The instructions, when executed, cause the one or more processors to: receive a query; identify search results that are responsive to the query; identify a content item for presentation along with the search results; determine, based on one or more criteria, when the content item is to be augmented; and, when it is determined that the content item is to be augmented and after identifying the search results: augment the content item based at least in part on an entry in the search result creating an augmented content item, and provide the augmented content item.

Particular implementations may realize none, one or more of the following advantages. Content items (e.g., advertisements) can be augmented in real-time, using information from associated search results entries. Augmented content items can be more interesting and/or relevant to a user and lead to increases in associated user interactions. Content and user interface consistency can be improved between advertisements and search results.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2D shows an example augmented content item that includes components from search results.

Like reference numbers and designations in the various drawings indicate like elements.

DETAILED DESCRIPTION

This document describes systems, methods, computer program products and mechanisms for providing an augmented content item. For example, in response to a received query (e.g., a search query), search results that are responsive to the query can be identified. The organic search results that are un-sponsored can include individual search results that are selected based on matching the query terms and phrases in the query to content that is crawled by a search engine or affiliated systems. A content item (e.g., an advertisement) can be identified for presentation along with the search results. A determination can be made, using one or more criteria, when the identified content item is to be augmented. When it is determined that the content item is to be augmented and after the search results are identified, augmentation can occur. For example, the content item can be augmented based at least in part on an entry in the search results, resulting in the creation of an augmented content item. The augmented content item can be provided, e.g., presented to a user with search results that are also responsive to the query.

In some implementations, content sponsors can specify whether or not they want their content items to be augmented as described herein. For example, campaign management interfaces provided to content sponsors can include opt-in and opt-out interfaces on a campaign level or some other level. In some implementations, campaign management interfaces can be provided that allow the content sponsor to control the types of content components used in augmentation and the situations in which augmentation can occur.

Figure 1:
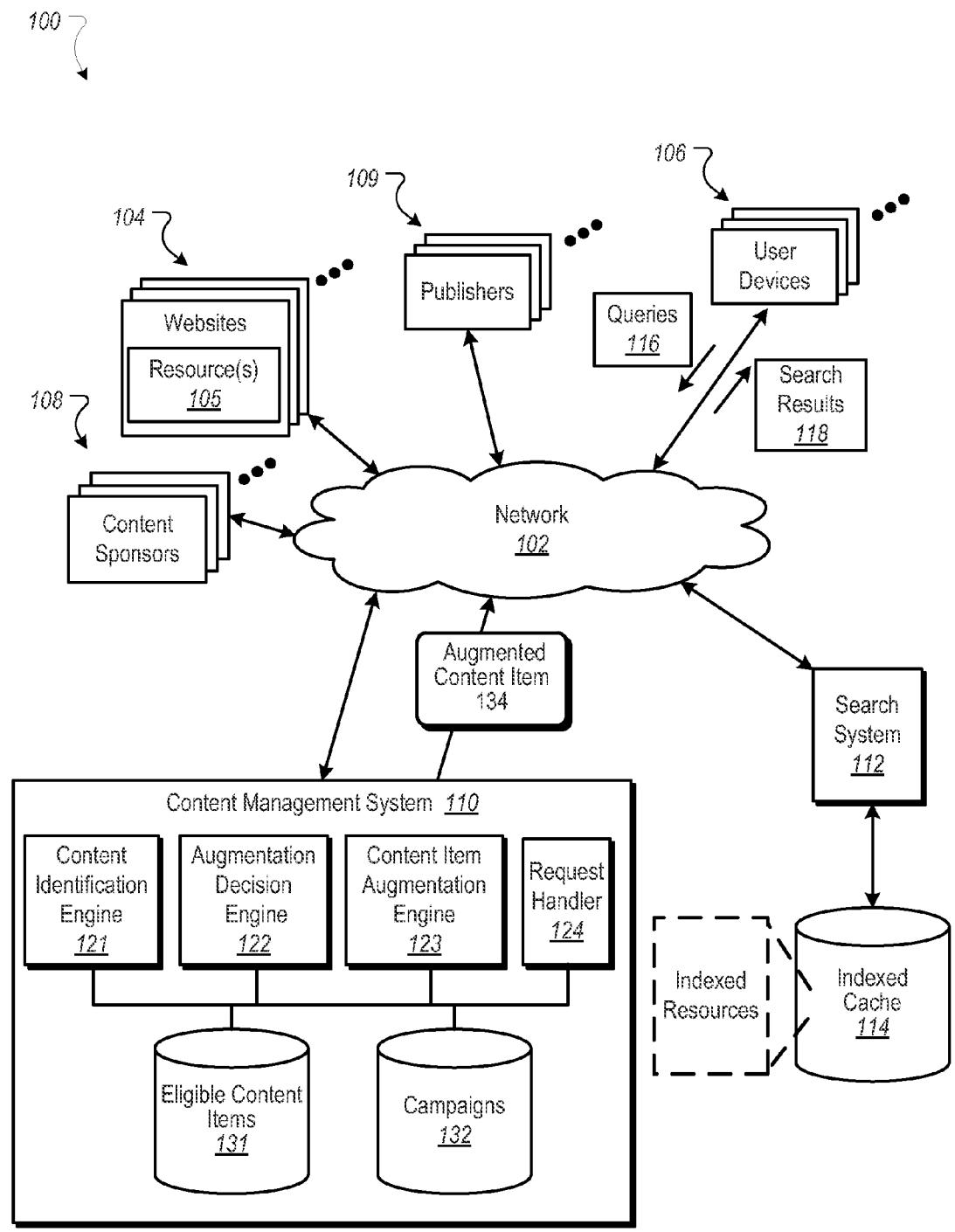
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

In some implementations, in response to a request for content (e.g., a search query 116), the content management system 110 can provide an augmented content item 134. For example, the augmented content item 134 can be generated from a content item that is responsive (e.g., relevant) to a search query 116 and augmented using information from an entry in search results 118 that are also responsive to the search query 116.

The content management system 110 can include plural engines. A content identification engine 121, for example, can evaluate terms and phrases in a query received by the content management system 110 to identify content responsive to the request. The content can include a specific content item (e.g., an advertisement) and/or search results that are responsive to the query. In some implementations, the content items can be identified using an indexed cache 114, described in more detail below.

An augmentation decision engine 122, for example, can determine, based on one or more criteria, when the content item is to be augmented. For example, for a content item to be considered for augmentation, the content item can be associated with a campaign in which the campaign's content sponsor has designated that content items associated with the campaign are to be augmented. Such a designation can occur, for example, in a user interface used by the content sponsor to define and maintain the campaign's parameters and other information.

In some implementations, augmentation of content using search results can occur at a client, e.g., on a user device 106 using a browser or some other application. For example, augmentation using advertisements and search results can be accomplished using a JavaScript™ script delivered to the client. The JavaScript™ script can inspect the search results and a proposed advertisement and augment the proposed advertisement either with new/replaced components, or alter the user experience in some way.

A content item augmentation engine 123, for example, can augment the content item based at least in part on an entry in the search results. For example, the augmenting can include adding copy from the search result, synthesizing site links, substituting copy from a search result entry, or synthesizing one or more location extensions. As a result, an augmented content item is created that includes information from an original version of the content item, modified to include additional content from the search result entry. In some implementations, substitution (partial or complete) can occur based on the augmentation.

A request handler 124, for example, can handle requests for content received by the content management system 110, and in response to each request, provide one or more content items to the requestor. For example, the request for content can be a request to fill a content item slot on a web page displayed in a browser on the user device 106. In response to the request for content, the request handler 124 can provide a content item, e.g., a camera advertisement having characteristics that match the characteristics of an advertisement slot on the user device 106. The request handler 124 can also provide search results 118 in response to received search queries 116.

The environment 100 can include plural data stores, which can be stored locally by the content management system 110, stored somewhere else and accessible using the network 102, generated as needed from various data sources, or some combination thereof. A data store of eligible content items 131, for example, can include content items (e.g., advertisements) that can be selected by the content management system 110 in response to a content item request. A data store of campaigns 132, for example, can include information about campaigns (e.g., advertisement campaigns) associated with content sponsors 108. Each campaign, for example, can identify the conditions in which content items associated with the campaign are to be selected and presented to a user.

In some implementations, content sponsors 108 can be provided with an interface for defining selection criteria associated with the selection of their content items for presentation to users. For example, content sponsors 108 can specify that their content items can be augmented using information from search results that are coincidentally selected and presented with their content item. In some implementations, content sponsors can specify how information in organic components (e.g., search results) is converted into advertisement components, such as with the use of tracking uniform resource locator (URL) templates.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the URL of the webpage. Search results pages can also include one or more slots in which other content items (e.g., ads) can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request.

Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals and behavioral signals.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations). The offers represent the amounts that the content sponsors are willing to pay for presentation (or selection or other interaction with) of their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a website or webpage, registering on a website, experiencing media, or performing a social action regarding a content item (e.g., an ad), such as republishing or sharing the content item. Other actions that constitute a conversion can also be used.

In some implementations, conversions may be more likely to occur when a user is presented with a content item that has been augmented using other relevant information, such as information from search results. For example, the user may be more likely to interact with an advertisement if the advertisement has been altered to include content from a search result entry.

For situations in which the systems discussed here collect and/or use personal information about users, the users may be provided with an opportunity to enable/disable or control programs or features that may collect and/or use personal information (e.g., information about a user's social network, social actions or activities, a user's preferences or a user's current location). In addition, certain data may be treated in one or more ways before it is stored or used, so that personally identifiable information associated with the user is removed. For example, a user's identity may be anonymized so that no personally identifiable information can be determined for the user, or a user's geographic location may be generalized where location information is obtained (such as to a city, ZIP code, or state level), so that a particular location of a user cannot be determined.

Figure 2A:
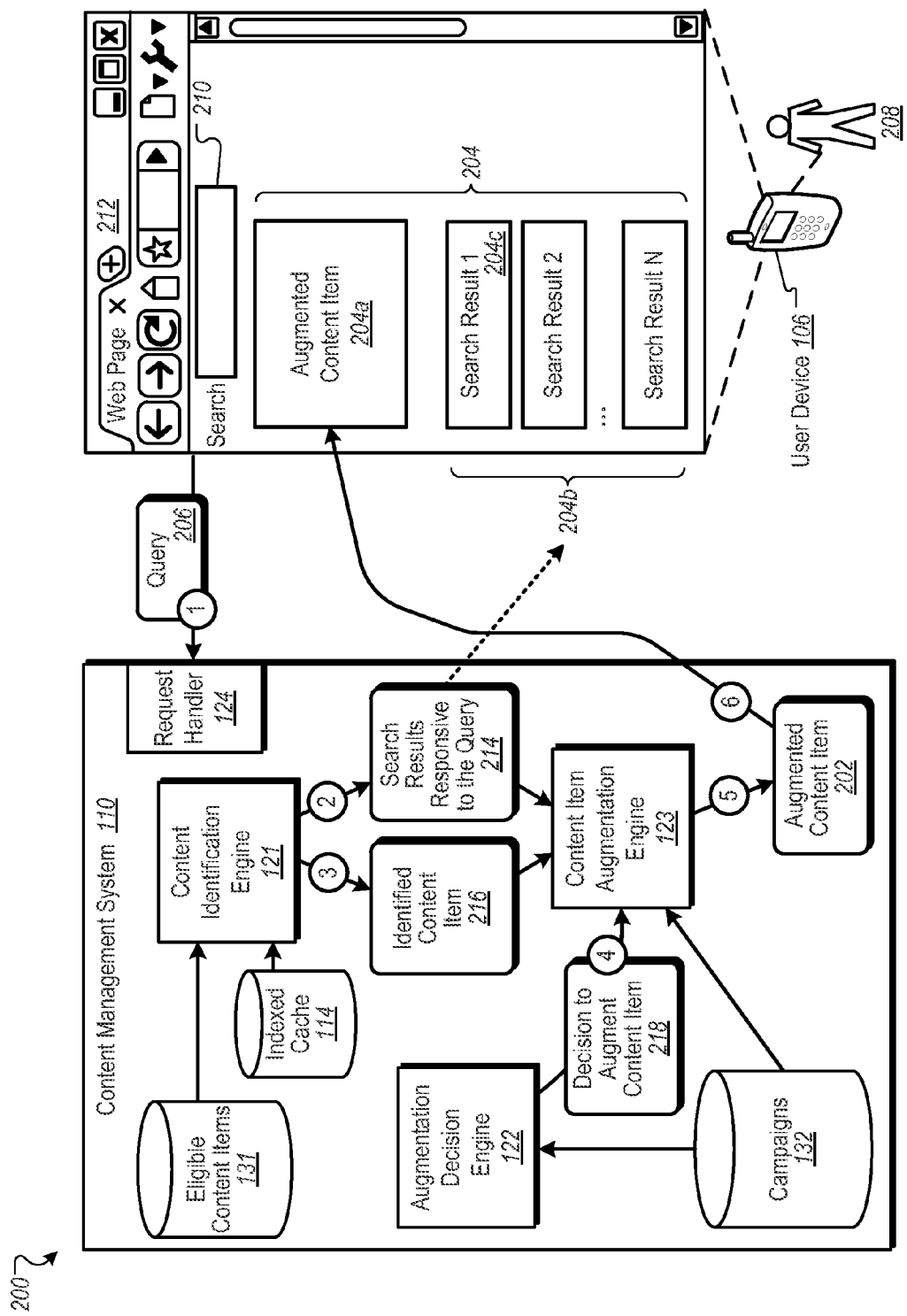
FIG. 2A shows an example system for augmenting a content item using information from a search result entry.

FIG. 2A shows an example system 200 for augmenting a content item using information from a search result entry. For example, the content management system 110 can provide an augmented content item 202 to be presented as an augmented content item entry 204a along with search results 204. The augmented content item 202, for example, can include information obtained from one or more search result entries 204b, such as a first search result entry 204c. A more detailed example follows using an example sequence of stages 1-6.

At stage 1, the content management system 110, for example, can receive/identify a query 206, e.g., from the user device 106. In some implementations, the query 206 can be received by the request handler 124. The query 206 can include one or more terms or phrases and can be entered, for example, by a user 208 in a query control 210 on a web page 212.

At stage 2, the content identification engine 121, for example, can identify search results 214 that are responsive (e.g., relevant to) the terms and phrases in the query 206. The identified search results 214 can be obtained, for example, from the eligible content items 131, such as described above with reference to FIG. 1. In some implementations, identification of the search results 214 can also be based on other information or signals, e.g., the location and/or interests of the user 208.

At stage 3, the content identification engine 121, for example, can also identify an identified content item 216, such as an advertisement or other sponsored content that is to be presented with the search results 214. The identification can also be based on the query 206 and other information and/or signals (e.g., the user's current location) that are received from the user device 106 or otherwise derived. In some implementations, the content identification engine 121 can identify more than one identified content item 216, and the remaining stages 4-6 can apply to the additional content items as well.

At stage 4, the augmentation decision engine 122, for example, can determine (218), based on one or more criteria, when the content item is to be augmented (308). The determination 218 can be made, for example, based on information from campaigns 132.

At stage 5, when it is determined that the content item is to be augmented and after identifying the search results, the content item augmentation engine 123, for example, can augment the identified content item 216 using information from one or more identified entries in the search results 214. For example, if the identified content item 216 is an advertisement for a camera, then the content item augmentation engine 123 can use information from camera-related search results 214 that are associated with a same entity to create the augmented content item 202. Augmentation is described in greater detail below.

Figure 2B:
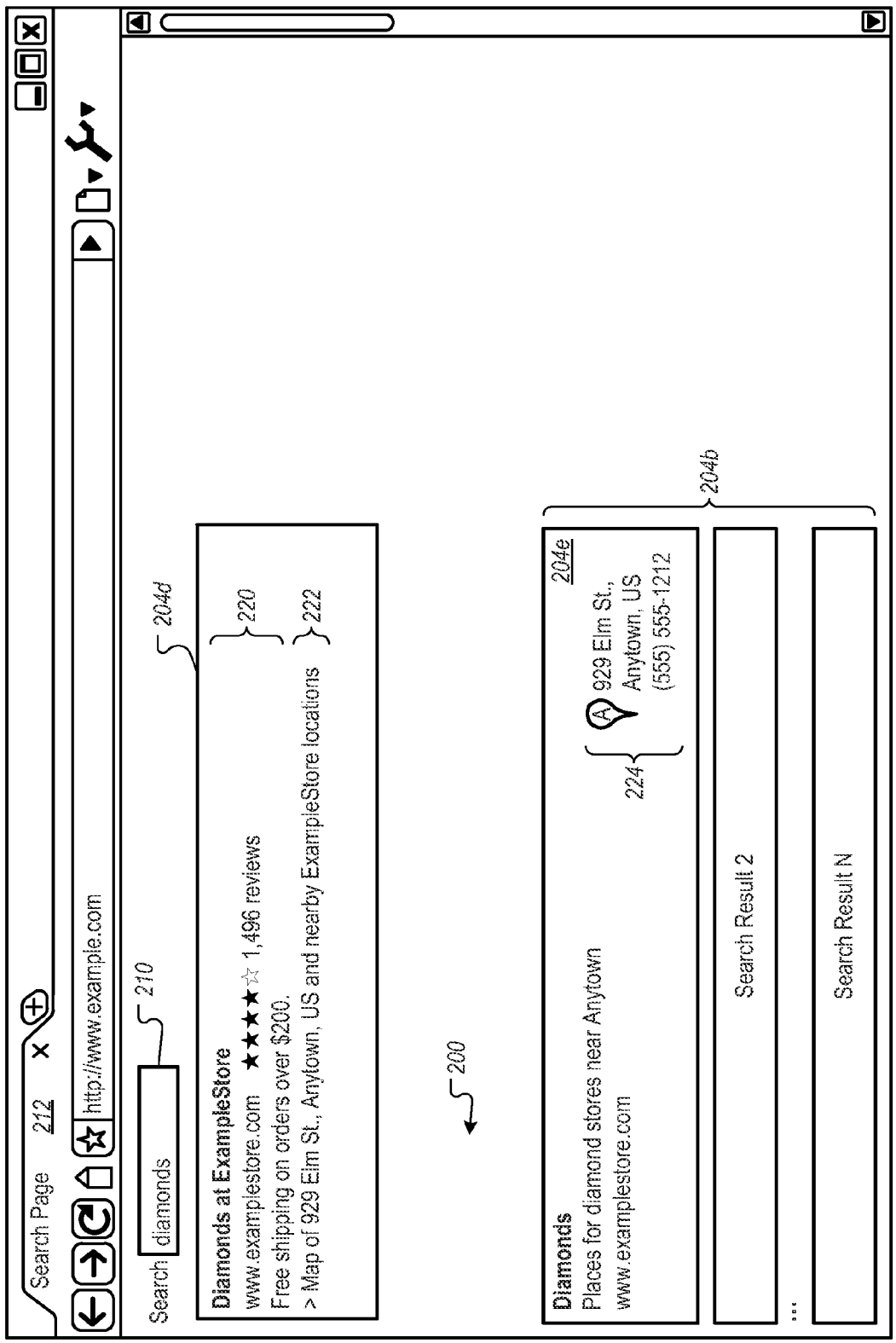
FIG. 2B shows an example augmented content item that includes a location extension.

The augmented content item is provided (312). For example, the request handler 124 can provide the augmented content item 202 to the user device 106 in response to the received query 206. The received augmented content item 202 can be displayed, for example, as the augmented content item 204a, e.g., above search result entries 204b FIG. 2B shows an example augmented content item 204d that includes a location extension. For example, in response to the search query (e.g., "diamonds") entered in the query control 210, the content management system 110 has provided an augmented content item 204d (e.g., a diamond-related advertisement) as part of the search result entries 204b (e.g., organic diamond-related search results). The augmented content item 204d in this example includes original, pre-augmentation content 220 (e.g., corresponding to content in a corresponding identified content item 216) and augmentation content 222. The content item augmentation engine 123 can use location information 224, for example, from a search result entry 204e to create the augmentation content 222. In some implementations, other augmentations in addition or in lieu of the augmentation content 222 can be used, e.g., using information from the same search result entry 204e and/or from other search result entries 204b. Also, while the augmented content item 204d appears, for example, as a sponsored content item at the top of search results, augmented content items can occur in other places, such as in skyscraper advertisements, banner advertisements, social network pages, and/or other places in which content items, including advertisements, can occur.

Figure 2C:
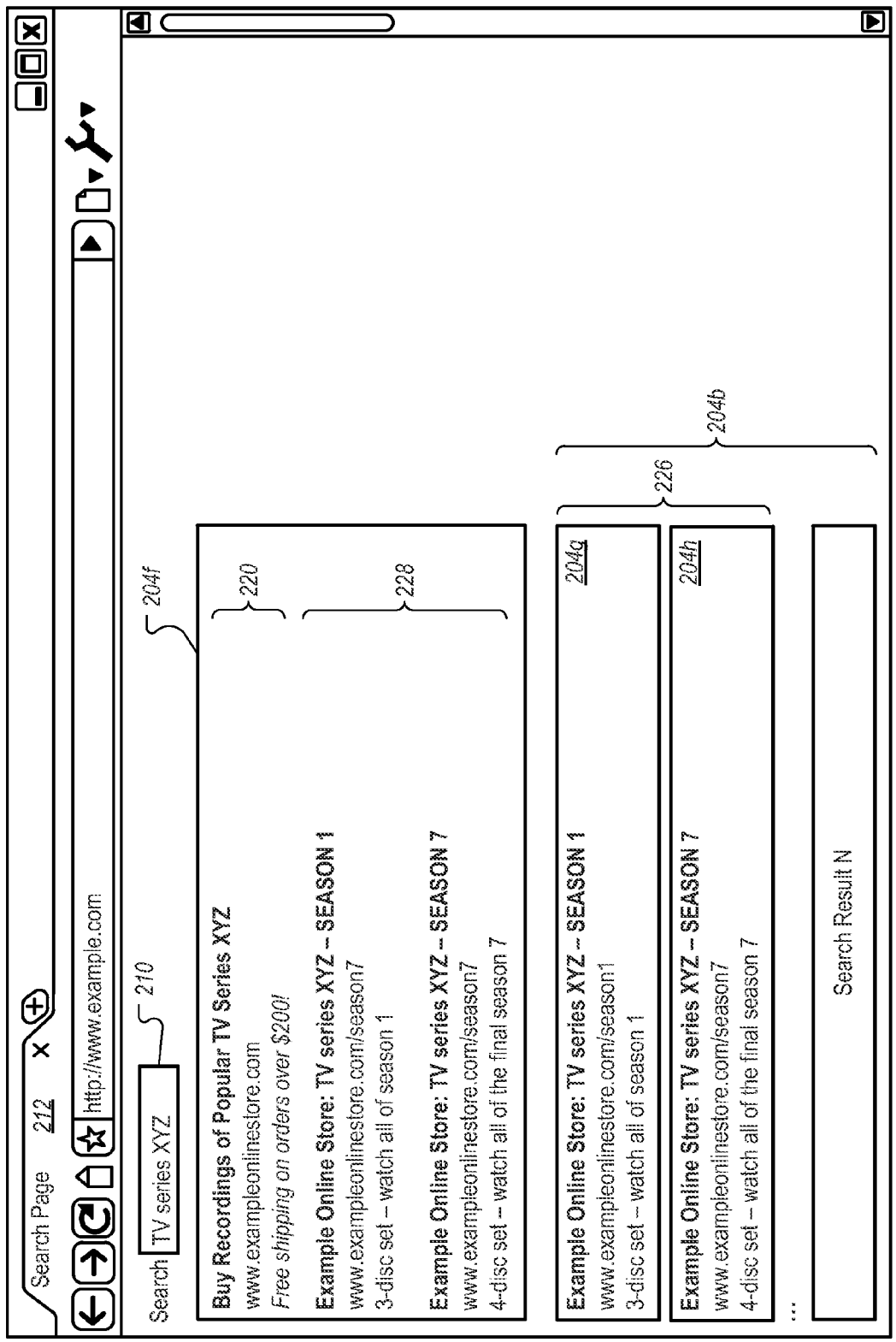
FIG. 2C shows an example augmented content item that includes copy from search results.

FIG. 2C shows an example augmented content item 204f that includes copy (e.g., snippet text) from search results. For example, in response to receipt of the search query (e.g., "TV Series XYZ") entered in the query control 210, the content management system 110 has provided the augmented content item 204f (e.g., an advertisement for selling Series XYZ products) with the search result entries 204b (e.g., organic search results related to the TV Series XYZ). The augmented content item 204f in this example includes original, pre-augmentation content 220 (e.g., corresponding to content in a corresponding identified content item 216) and augmentation content 228. The content item augmentation engine 123 can use copy 226, for example, from search result entries 204g and 204h to create the augmentation content 228. In this example, the visible URLs in the search result entries 204g and 204h do not exactly match the visible URL in the pre-augmentation content 220. However, the content item augmentation engine 123 can determine that the content is related based on a common domain, a common company, or other commonality shared between the search result entries 204g and 204h and the pre-augmentation content 220.

FIG. 2D shows an example augmented content item 204i that includes components from search results. For example, in response to the search query (e.g., "sporting goods") entered in the query control 210, the content management system 110 has provided the augmented content item 204i (e.g., an advertisement for ExampleSportsPlace) with the search result entries 204b (e.g., organic search results related to sporting goods). The augmented content item 204i in this example includes original, pre-augmentation content 220 (e.g., corresponding to content in a corresponding identified content item 216) and augmentation content 230. The content item augmentation engine 123 can use components 232, for example, from search result entry 204j to create the augmentation content 230. Some components 234 in search result entry 204j may be bypassed for use in augmentation, such as if they are determined by the content item augmentation engine 123 to be less popular components (e.g., based on fewer user interactions) or for other reasons (e.g., available space in a content item slot). In the example shown, line 236 in the augmented content item 204i includes pre-augmentation copy (e.g., "good deals on shipping," not shown) that has been replaced by replacement copy for line 236 (e.g., "FREE shipping on orders over $100.").

In some implementations, augmentation can occur when the form of the content item and the search results are different. For example, augmentation for site links can occur from search results, where the content is in one format, to an advertisement in a different format. In some implementations, augmentation for site links can be based on information from more than one search result.

Figure 3:
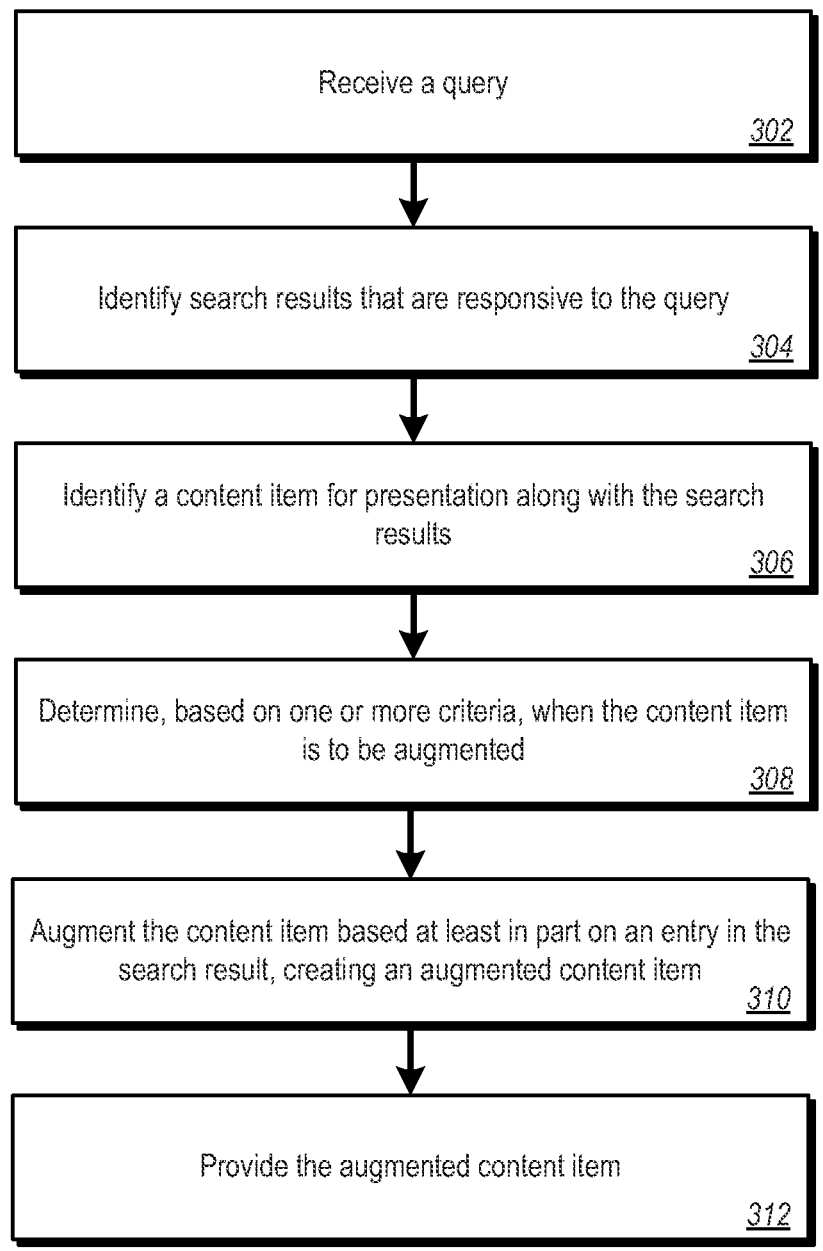
FIG. 3 is a flowchart of an example process for augmenting a content item using information from a search result entry.

FIG. 3 is a flowchart of an example process 300 for augmenting a content item using information from a search result entry. In some implementations, the content management system 110 can perform stages of the process 300 using instructions that are executed by one or more processors. FIGS. 1-2D are used to provide example structures for performing the stages of the process 300.

A query is received, e.g., that includes one or more terms or phrases (302). For example, the request handler 124 can receive the query 206 from the user device 106. The query 206, for example, can be entered by the user 208 in a query control 210 on the web page 212.

Search results are identified that are responsive (e.g., relevant) to the query (304). For example, the content identification engine 121 can identify search results 214 that are responsive (e.g., relevant to) the terms and phrases in the query 206. The identified search results 214 can be obtained, for example, from the eligible content items 131, such as described above with reference to FIG. 1.

A content item is identified for presentation along with the search results (306). As an example, the content identification engine 121 can identify an identified content item 216, such as an advertisement or other sponsored content that is to be presented with the search results 214.

A determination is made, based on one or more criteria, when the content item is to be augmented (308). The augmentation decision engine 122, for example, can make a determination as to whether the identified content item 216 is a content item that is a candidate for augmentation, e.g., based on information from campaigns 132 and characteristics of the content item. As an example, one criteria can be an association of the identified content item 216 and one of the search result entries 204b based on a common URL, brand, or entity for each.

In some implementations, determining when the content item is to be augmented can include determining when the content item and the search result entry are commonly sponsored (e.g., are associated with a same brand) and are concurrently (or not) visible on a same user interface. For example, one of the search result entries 204b, already visible on the user device 106, may be a potential source of augmentation content. In this example, the augmentation decision engine 122 can decide against augmentation, because the user can already see the content in question. In some implementations, determining concurrent visibility can be based on a fold line associated with a user interface used to present the search results and the content item. As an example, the decision of whether to augment can be made by the augmentation decision engine 122 based on the location of the fold, e.g., a position within the search results for which entries are displayed on the user device 106 without scrolling. In some implementations, determining concurrent visibility can be based on a location of the search result entry, and wherein augmenting occurs only when the search result entry is not on a first page of the search results. For example, the augmentation decision engine 122 can decide in favor of augmentation when the search result entry that is the source of augmentation content is on a second or later page of the search results. Similarly, when a second page of search results is shown, eligible search results that can be the source of augmentation content can be included on a first or other (not second) search results pages. In some implementations, determining concurrent visibility can be based on a user scroll activity. As an example, the augmentation decision engine 122 can base a decision of whether or not to augment on whether the user 208 typically and/or historically scrolls to a second and subsequent pages of search result entries 204b. In this example, the augmentation decision engine 122 can decide against augmentation if it is determined that the user 208 is likely to see the content in question at some nearby point in time. In another example, if a j-th page of the search results is displayed, then the augmentation decision can be made based on whether eligible content is present on other (not the j-th) page of the search results.

When it is determined that the content item is to be augmented and after identifying the search results, the content item is augmented based at least in part on an entry in the search results, creating an augmented content item (310). For example, the content item augmentation engine 123 can augment the identified content item 216 using information from the one of the entries in the search results 214.

In some implementations, augmenting the content item can include adding copy from a search result entry into the content item to create the augmented content item. For example, the content item augmentation engine 123 can extract text and/or part of the snippet in one of the search result entries 204b, such as the first entry. The text can include, for example, words or phrases or links that the content item augmentation engine 123 determines should be included (e.g., are otherwise missing from the identified content item 216) and which may be of interest to the user.

In some implementations, augmenting the content item can further include adding components to the content item from the search result entry. As an example, the content item augmentation engine 123 can add or change one or more of creative text, extension or content item format, e.g., found in a first entry 204c of the search result entries 204b, to the augmented content item 202. Extensions, for example, can include location extensions (e.g., detailed information about a specific physical location), such as address information, map information, and/or other location-related information. Other information can be used for augmentation, such as site links. Site links can include site links for a particular instantiation of an entity or a presence of the entity. A variety of information can be used for augmentation, for example, when the identified content item 216 and the first entry 204c have the same domain and are associated with the same entity (e.g., company), map information associated with a specific instance of the entity can be included. The map information can include, for example, one or more of a map, a map thumbnail, a link to a map, a map marker, or other map information.

In some implementations, augmenting can include synthesizing site links for the content item. A determination can be made that a specific search result entry and an identified content item are associated, based at least in part, on uniform resource locators (URLs) for the two. Given the determination, site links with URLs and titles inferred from the search result entry can be created. As an example, the content item augmentation engine 123 can determine whether the URLs for the pre-augmentation content 220 and the search result entry 204e are the same, or the entries correspond to the same company. If the entries are associated, then the content item augmentation engine 123 can produce or synthesize other content (site links or other content) for inclusion in the augmented selected content item (e.g., advertisement).

In some implementations, augmenting the content item can include substituting copy from a search result entry for content included in a creative associated with the content item. For example, referring to FIG. 2D, replacement copy 236 (e.g., "FREE shipping on orders over $100.") obtained from one of the search result entries 204 is substituted for "good deals on shipping" (not shown) that was part of the pre-augmentation content 220.

In some implementations, the copy can be selected by a search system as part of the identification of the search results, and substituting can include substituting the copy for one or more of the headline, text, destination link, or other portion of the content item. As an example, the content management system 110 can select the copy to be used in substitution when identifying the search results 214. Further, the copy that is substituted can include the headline (e.g., "Diamonds at ExampleStore"), text (e.g., "Free shipping on orders over $200"), or a destination link (e.g., www.examplestore.com).

In some implementations, content sponsors can define how links or URLs are copied from search results to content items. For example, some content sponsors may provide tracking template URLs, and when the destination link is used in a content item (e.g., an advertisement), the destination link can be transformed according to the tracking template.

For example, if the search result has a URL such as http://www.example.com/page, and the content sponsor has specified a tracking template of http://www.someanalyticscompany.com/click?track={url}&type=ad, then the URL used in the content item can be, e.g., http://www.someanalyticscompany.com/click?track=http://www.example.com/page1&type=ad.

In some implementations, augmenting can include synthesizing one or more location extensions to be included with the content item, including matching same-domain or same-entity organic search result entries associated with an entity with the content item and copying location information for a presence associate with the entity and including the location information in the augmented content item. For example, the content item augmentation engine 123 can compare and analyze information in the pre-augmented content item and search result entries 204b in order to determine a correlation between the search result entry and the selected content item. As a result, the content item augmentation engine 123 can create, for example, the augmentation content 222 using information from the search result entry 204e for use in the augmented content item 204d.

In some implementations, other features can be synthesized as well. For example, "click to call" controls can be synthesized from phone numbers in search results, "click to download" controls can be synthesized from search results linking to application stores, and "enhanced site link" controls can be synthesized from entire organic results.

In some implementations, augmenting can include replacing one or more content item components with similar components from the search result entry only when first criteria are satisfied. For example, selection of augmentation content by the content item augmentation engine 123 can depend on quality or performance criteria of the content, e.g., how well the original content item (or the substitute content) performs regarding user interactions (e.g., click-throughs). In some implementations, augmenting can include inserting components from the search result entry into one or more content item components, e.g., when the first criteria are satisfied or in other situations.

In some implementations, augmenting can include altering the content item to be consistent with other content displayed as part of the search results. For example, the content item augmentation engine 123 can change the display characteristics (e.g., font, color, style, etc.) of the augmented content item (e.g., 204d) match the display characteristics of the remaining search result entries 204b.

In some implementations, augmenting can include altering the content item so as to vary the content item relative to other content displayed as part of the search results. As an example, the content item augmentation engine 123 can change the display characteristics of the augmented content item 204d, such as altering a content item to be consistent with other content items, or varying the content item's format so that the content item is different from (e.g., inconsistent with) other content items, e.g., to make the content item stand out visually to the user. For example, the content item augmentation engine 123 can decide to replace similar components in a content sponsor's content item specified by an advertiser, e.g., when signals such as user interactions indicate that the replaced components will perform better than the content sponsor-specified ones.

The augmented content item is provided (312). For example, the request handler 124 can provide the augmented content item 202 to the user device 106 in response to the received query 206.

In some implementations, providing the augmented content item can include providing the augmented content item along with search results. For example, as described above with reference to FIGS. 2B, 2C and 2D, respectively, augmented content items 204d, 204f and 204i can each be presented with the search result entries 204b.

In some implementations, providing the augmented content item can include logging the augmented content item, e.g., in whole or in part. For example, instead of (or in addition to) presenting the augmented content item 204d, 204f and 204i, part or all of the augmented content item can be stored, e.g., for later use. In some implementations, the method 300 can further include providing suggestions to content sponsors based on logged augmented content items. For example, the logged/stored augmented content items can subsequently be presented to content sponsors 108, e.g., in user interfaces for suggesting modified versions of creatives that the content sponsors 108 can select from to update their campaigns. Providing suggestions to content sponsors can include, for example, displaying the augmented content items, and optionally including metrics associated with the performance of the augmented content items.

In some implementations, when augmented content items are presented to the user, e.g., with search results, the source and/or rationale for providing the information can be provided to the user.

Figure 4:
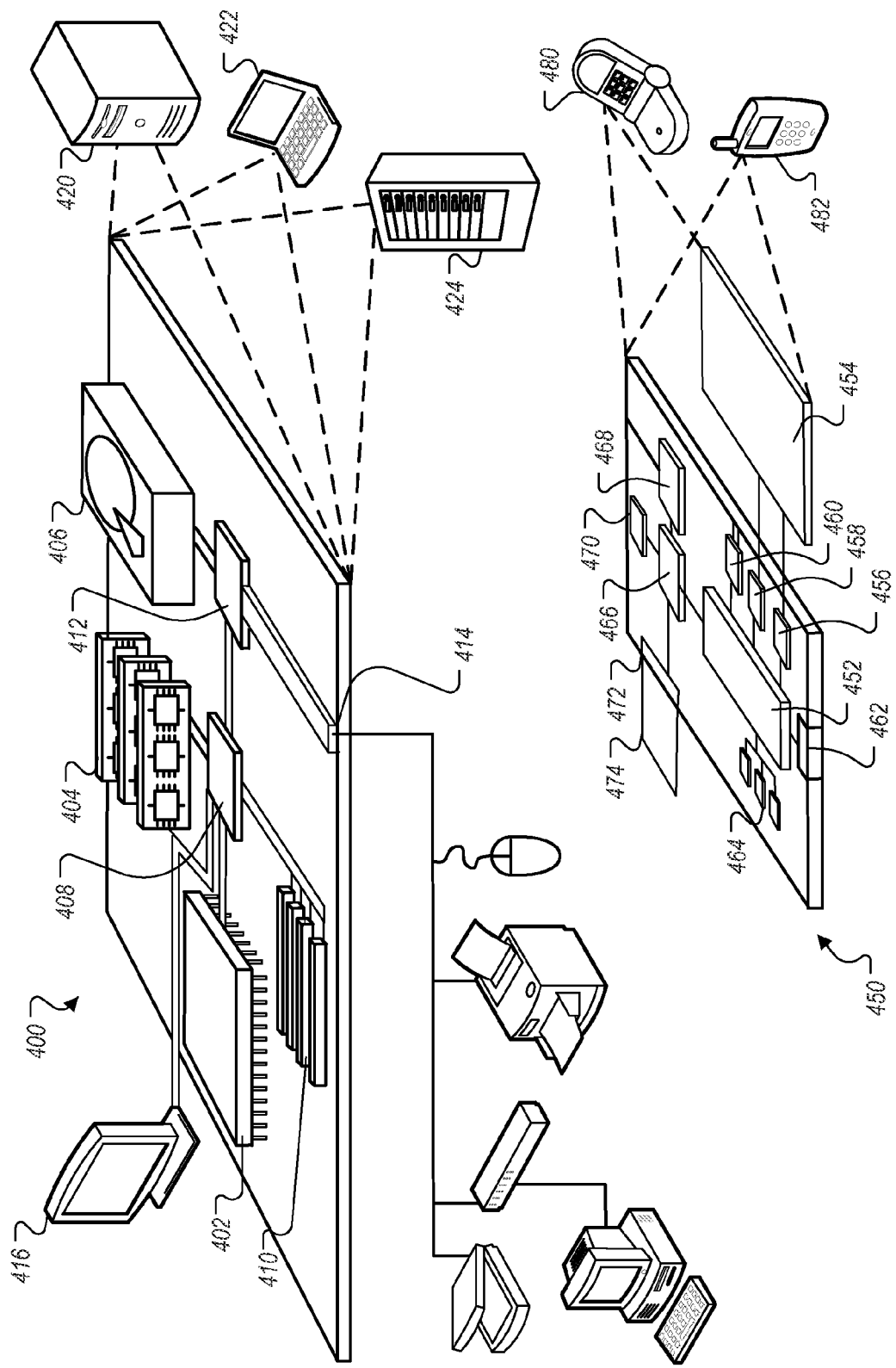
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   receiving, from a content provider and by one or more processors, an augmentation-eligible content item that includes pre-augmentation content;
   receiving, from a user device and by one or more processors, a search query;
   identifying search results that are responsive to the search query for inclusion in a search results page;
   selecting, by one or more processors, the augmentation-eligible content item for presentation along with the search results;
   after identifying the search results, but prior to transmitting the augmentation eligible content item to the user device:
      determining, by the one or more processors, that the augmentation-eligible content item is to be augmented prior to presentation with the search results based, at least in part, on a determination that one of the identified search results, that is related to a product or service identified in the content item, will not be concurrently viewable with the augmentation-eligible content item in an initial presentation of the search results page; and
      augmenting, by the one or more processors, the augmentation-eligible content item based at least in part on an entry in the search results, including combining content from the one of the identified search results with the pre-augmentation content to create an augmented content item that includes a visualization of the pre-augmentation content and the content from the one of the identified search results; and
   transmitting, by the one or more processors, the augmented content item to the user device, including causing the user device to present the augmented content item with at least a portion of the identified search results in the search results page.

2. The method of claim 1 wherein augmenting the augmentation-eligible content item includes adding copy from a search result entry into the augmentation-eligible content item to create the augmented content item.

3. The method of claim 2 wherein augmenting the augmentation-eligible content item further includes adding components to the augmentation-eligible content item from the search result entry.

4. The method of claim 3 wherein the components are selected from the group comprising creative text, extension or content item format components.

5. The method of claim 4 wherein the extensions are location extensions.

6. The method of claim 1 wherein augmenting includes synthesizing site links for the augmented content item including determining that a search result entry and the augmentation-eligible content item are associated based at least in part on uniform resource locators (URLs) for the two and creating site links with one or more of the URLs and titles inferred from the search result entry.

7. The method of claim 1 wherein augmenting the augmentation-eligible content item includes substituting copy from a search result entry for content included in a creative associated with the augmentation-eligible content item.

8. The method of claim 7 wherein the copy is selected by a search system as part of the identification of the search results, and wherein substituting includes substituting the copy for one or more of the headline, text, destination link, or other portion of the augmentation-eligible content item.

9. The method of claim 1 wherein augmenting includes synthesizing one or more location extensions to be included with the augmentation-eligible content item including matching same domain or same entity organic search result entries associated with an entity with the augmentation-eligible content item and copying location information for an entity and including the location information in the augmented content item.

10. The method of claim 1 wherein determining based on one or more criteria when the augmentation-eligible content item is to be augmented includes determining when the augmentation-eligible content item and the search result entry are concurrently visible on a same user interface and not augmenting the augmentation-eligible content item based on the concurrent visibility.

11. The method of claim 10 wherein determining concurrent visibility is based on a fold line associated with a user interface used to present the search results and the augmentation-eligible content item.

12. The method of claim 10 wherein determining concurrent visibility is based on a location of the search result entry, and wherein augmenting occurs only when the search result entry is not on a first page of the search results.

13. The method of claim 10 wherein determining concurrent visibility is based on a user scroll activity.

14. The method of claim 1 wherein augmenting includes replacing one or more content item components with similar components from the search result entry only when first criteria are satisfied.

15. The method of claim 14 wherein the first criteria are quality or performance criteria based on a proposed augmentation.

16. The method of claim 1 wherein augmenting includes altering the augmentation-eligible content item to be consistent with other content displayed as part of the search results.

17. The method of claim 1 wherein augmenting includes altering the augmentation-eligible content item so as to vary the content item relative to other content displayed as part of the search results.

18. The method of claim 16 wherein altering includes altering a content item format.

19. The method of claim 17 wherein varying includes varying a content item format.

20. The method of claim 1 wherein providing includes providing the augmented content item along with search results.

21. The method of claim 1 wherein providing includes logging the augmented content item.

22. The method of claim 21 further comprising providing suggestions to content sponsors based on logged augmented content items.

23. A computer program product embodied in a non-transitive computer-readable medium including instructions, that when executed, cause one or more processors to:
receive, from a content provider and by one or more processors, an augmentation-eligible content item that includes pre-augmentation content;
receive, from a user device and by one or more processors, a search query;
identify search results that are responsive to the search query for inclusion in a search results page;
select, by one or more processors, the augmentation-eligible content item for presentation along with the search results;
after identifying the search results, but prior to transmitting the augmentation eligible content item to the user device:
determine, by the one or more processors, that the augmentation-eligible content item is to be augmented prior to presentation with the search results based, at least in part, on a determination that one of the identified search results, that is related to a product or service identified in the content item, will not be concurrently viewable with the augmentation-eligible content item in an initial presentation of the search results page; and
augment, by the one or more processors, the augmentation-eligible content item based at least in part on an entry in the search results, including combining content from the one of the identified search results with the pre-augmentation content to create an augmented content item that includes a visualization of the pre-augmentation content and the content from the one of the identified search results; and
transmit, by the one or more processors, the augmented content item to the user device, including causing the user device to present the augmented content item with at least a portion of the identified search results in the search results page.

24. A content management system comprising:
a content identification engine that evaluates terms and phrases in a query received by the content management system to identify content responsive to a request;
an augmentation decision engine that determines, based on one or more criteria, when the content item is to be augmented;
a content item augmentation engine that augments the content item based at least in part on search results entries;
a request handler that handles requests for content received by the content management system, including selecting and providing content in response to requests for content;
one or more processors; and
one or more memory elements including instructions that, when executed, cause the one or more processors to:
receive, from a content provider and by one or more processors, an augmentation-eligible content item that includes pre-augmentation content;
receive, from a user device and by one or more processors, a search query;
identify search results that are responsive to the search query for inclusion in a search results page;
select, by one or more processors, the augmentation-eligible content item for presentation along with the search results;
after identifying the search results, but prior to transmitting the augmentation eligible content item to the user device:
determine, by the one or more processors, that the augmentation-eligible content item is to be augmented prior to presentation with the search results based, at least in part, on a determination that one of the identified search results, that is related to a product or service identified in the content item, will not be concurrently viewable with the augmentation-eligible content item in an initial presentation of the search results page; and
augment, by the one or more processors, the augmentation-eligible content item based at least in part on an entry in the search results, including combining content from the one of the identified search results with the pre-augmentation content to create an augmented content item that includes a visualization of the pre-augmentation content and the content from the one of the identified search results; and
transmit, by the one or more processors, the augmented content item to the user device, including causing the user device to present the augmented content item with at least a portion of the identified search results in the search results page.

* * * * *